United States Patent [19]

Arabia et al.

[11] Patent Number: 4,876,892
[45] Date of Patent: Oct. 31, 1989

[54] PRESSURE SENSOR

[75] Inventors: F. Gene Arabia, Yorba Linda, Calif.; Zvi Shkedi, Tucson, Ariz.; Randy L. Brandt, Orange, Calif.

[73] Assignee: Allied-Signal Inc., Phoenix, Ariz.

[21] Appl. No.: 183,103

[22] Filed: Apr. 19, 1988

[51] Int. Cl.[4] .................................... G01L 9/12
[52] U.S. Cl. .......................... 73/718; 73/724; 331/65
[58] Field of Search .................. 73/718, 724, 708; 331/65, 135; 361/283; 333/213, 214, 215; 374/143

[56] References Cited

U.S. PATENT DOCUMENTS

| | | | |
|---|---|---|---|
| 3,978,420 | 8/1976 | Lane | 333/214 |
| 4,001,735 | 1/1977 | Cheng et al. | 331/213 |
| 4,091,340 | 5/1978 | Greaves et al. | 333/214 |
| 4,286,462 | 9/1981 | Bourne | 73/189 |
| 4,383,230 | 5/1983 | Manzolini | 333/214 |
| 4,485,356 | 11/1984 | Fassino | 333/215 |
| 4,644,798 | 2/1987 | Tamura et al. | 73/708 |

OTHER PUBLICATIONS

Korn, Granino A., and Teresa A., *Electronic Avalog and Hybird Computers*, pp. 8–11, 114–119, 1964, McGraw Hill.
Graeme, Jerald G., and Gene E. Tobey, *Operational Amplifiers Design and Applications*, pp. 15, 385–391, 1971, McGraw-Hill.
"Active Resonators Save Steps in Designing Active Filters", Electronics, Apr. 1972, pp. 106–110.
"Precision Quadrature Oscillator", product brochure No. 4423, by Burr-Brown, Inc., (selected pages).

*Primary Examiner*—Donald O. Woodiel
*Attorney, Agent, or Firm*—Terry L. Miller; James W. McFarland

[57] ABSTRACT

A pressure sensor includes a variable capacitor responsive to an applied fluid pressure to predictably change capacitance value. A tuned oscillator circuit having an inductive impedance includes the variable capicitor and simulates a resonant inductive-capacitive circuit not including an inductor. The tuned circuit oscillator to provide a signal with a period which is a function of the variable capacitance value, and of the applied fluid pressure. Additional elements are provided for precise measurement of the variable signal, correction for temperature effects, correction of measurement aberrations, and production of an output signal in a preferred format.

32 Claims, 2 Drawing Sheets

PRESSURE SENSOR

BACKGROUND OF THE INVENTION

This invention relates generally to a pressure sensor including electronic circuitry and method which may be used in conjunction with a single or dual variable capacitance pressure transducer. The pressure transducer changes capacitance predictably in response to changes in fluid pressure applied thereto. More particularly, the invention relates to a tuned oscillator circuit and method which supplies a highly accurate output, with minimum frequency jitter, and including a variable capacitance pressure transducer.

The need for highly accurate indications of pressure is particularly acute in the avionics field where measurement of several different pressures is utilized to provide information about aircraft altitude, mach number, air speed, angle of attack, and yaw angle. In both military and commercial aircraft applications such information is necessarily derived from several pressures which must be accurately measured.

The conventional sensor system for measuring each one of such pressures usually includes three components, namely, a pitot tube sensing pressure exterior to the aircraft, a transducer communicating with the pitot-tube for converting sensed pressure into an electrical signal, and a circuit yielding either an analog or digital electrical representation of the pressure communicating to the transducer.

A variable capacitance transducer, as shown in U.S. Pat. No. 3,962,921, to Lips, may be used to convert changes in pressure into changes in capacitance. Circuitry, including the capacitive transducer produces an output signal the frequency of which is dependent on the capacitance of the transducer, and which is in turn dependent upon the fluid pressure applied to the transducer.

One technique for measuring capacitance involves the use of an inductor and capacitor in resonance (L-C circuit). This circuit is naturally a tuned circuit due to the conservative nature of the electrical energy transfer and storage between the two interactive elements. Using an inductor, however, adds undesirable weight to the sensor and limits its use in an aerospace environment.

Another technqiue for measuring capacitance is the single resistor-capacitor (R-C) oscillator producing a voltage triangular waveform across a variable capacitor. The frequency of the triangle waveform is a function of the capacitance value of the variable comparator. A comparator is used to detect the level of capacitor voltage, and to reverse the phase of the triangular wave once the capacitor voltage reaches a given level. However, this triangular waveform oscillator circuit is not tuned, and therefore exhibits a much poorer frequency stability than a tuned circuit. That is, the circuit produces higher levels of frequency jitter than is desired in aerospace applications.

The demands of the aerospace field call for a reduction of size and weight of all aircraft components, including pressure transducers, coupled with improved accuracy and resolution. However, increases in instrument sensitivity bring about undesirable increases in susceptibilty to random interference and jitter. A sensor including electronic circuitry which is light in weight, does not require an inductor, and which can convert the variable capacitance from a pressure transducer into a reliable electronic signal with minimum interference is therefore highly desired in the aviation industry.

SUMMARY OF THE INVENTION

The present invention provides a pressure sensor which utilizes triple operational amplifiers in a circuit capable of simultaneously measuring two variable capacitances to provide a highly reliable output signal indicative of those capacitances. In theory, the operational amplifier circuit simulates a parallel connected inductive-capacitive (L-C) circuit. The simulation of a tuned (L-C) circuit by the present invention, however, offers the dual advantages that the output frequency shifts as a linear function of change in capacitance, and that an inductor is not required in the circuit. The circuit of the present invention has the characteristics of a tuned (L-C) circuit, such as precise resonant frequency for specific values of inductance and capacitance, but without the costly, inefficient and unwieldly physical size and weight of an inductor, as would be a part of a conventional (L-C) circuit. The circuit of the present invention gives the tuned circuit accuracy of an (L-C) circuit, and the size and weight advantages available in a single (R-C) circuit.

When the two pressure-responsive variable capacitances included by the circuit of the present invention are equal all of the time, as would optimally be the case in the dual capacitive pressure transducer, the time period of the output signal produced is a linear function of the value of the two identical variable capacitances. The time period of the signal produced is fed into a microprocessor to compute the pressure associated with the output signal frequency. Thus, a linear relationship between the value of the capacitances and the time period of the output signal will allow a reduced number of calculation steps and less required memory capacity for the microprocessor. Also, the sensed pressure may be computed more rapidly because of the linear capacitance-to-frequency relationship.

In addition the circuit of the present invention can be utilized with a single variable capacitance transducer, with the other capacitance value being fixed. This embodiment is useful in instances in which the additional computational steps and memory required in computing a pressure not based on a linear relationship is permissible. In this case, the circuit is still a tuned circuit and still exhibits exceptional frequency stability, having a statistically narrowly distributed frequency jitter.

BRIEF DESCRIPTION OF THE DRAWINGS

Further advantages of the invention will become apparent from the following description and claims, and from the accompanying drawings wherein:

DESCRIPTION OF THE PREFERRED EMBODIMENT

Figure 1:
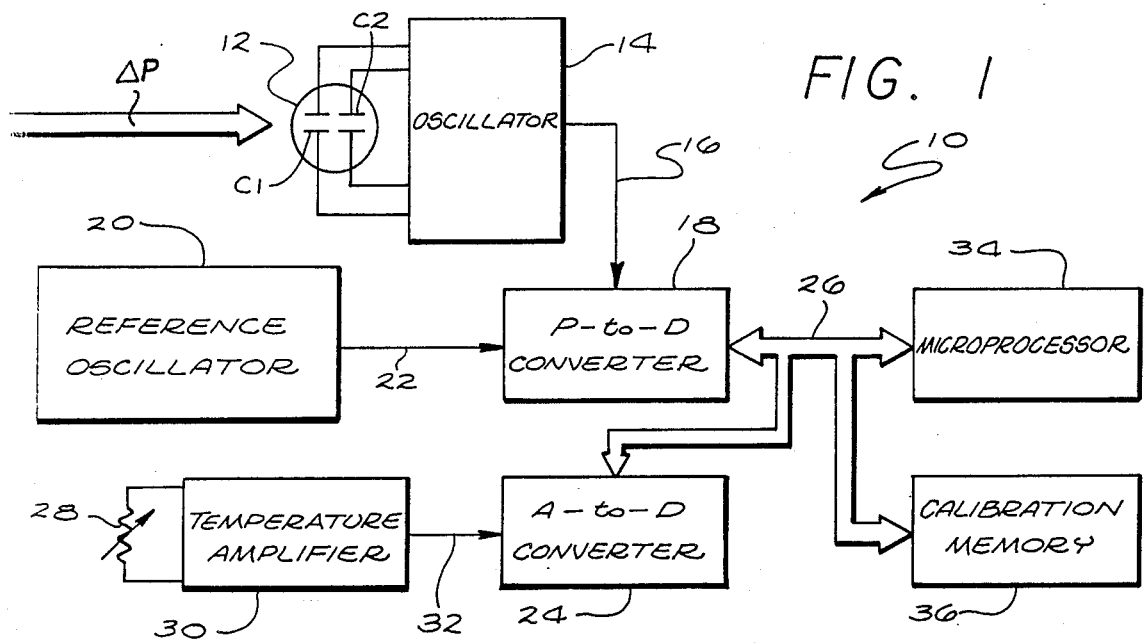
FIG. 1 is a simplified block diagram of a pressure sensor embodying the present invention.

Referring to FIG. 1, a simplified block diagram of a pressure sensor 10 according to the invention is shown. The pressure sensor 10 includes a quartz capsule 12 which is subject to external pressure variation depicted by arrow ΔP. The external pressure variation can be brought about by any of a number of means including the placing of the capsule into the environment whose pressure is to be measured, or the use of some pressure communicating conduit (not shown) to transmit fluid pressure from a remote location. The applicant has found that the best material from which to construct the pressure capsule 12 is fused quartz or silicon. Inside quartz capsule 12 are capacitors C1 and C2 whose capacitances are equal and vary equally in response to the external pressure acting upon quartz capsule 12. This capacitance change of capsule 12 is brought about by a change in the separation of the capacitor plates of capacitors C1 and C2. A physical deformation in the quartz capsule 12 in response to changes in external pressure effects the change in capacitances C1 and C2. Capacitor C1 and capacitor C2 are electrically connected in an oscillator circuit 14. The electrical relationship of capacitor C1 and C2 to the remainder of the oscillator circuit 14 will be later explained in greater detail.

The oscillator circuit 14 including capacitors C1 and C2 produces a sinusoidal output frequency on conductor 16, the frequency of which is directly dependent upon the values of capacitors C1 and C2. This output frequency is provided via conductor 16 to a oscillator period-to-digital converter 18. The sensor 10 also includes a reference high frequency crystal oscillator 20 which produces a constant reference frequency signal. This constant reference frequency is transmitted to the oscillator period-to-digital converter 18 via conductor 22. The converter 18 preferably includes a high speed comparator converting the sinusoidal waveform from oscillator 14 into a square waveform. Desirably, the converter 18 also includes a divider operating on the square waveform and driving a gate to enable passage or stop passage of the signal from reference frequency oscillator 20. Thus, a pulse train having a count indicative of the capacitance values of capacitors C1 and C2 is provided by the converter 18 to a data bus 26.

In order to account for any errors which might occur in quartz capsule 12 due to temperature effects, a temperature sensor 28 senses the temperature near quartz capsule 12. Temperature sensor 28 is connected to a temperature amplifier 30. Temperature amplifier 30 produces an analog signal indicative of the magnitude of the temperature measured at sensor 28, and provides this signal via a conductor 32 to the analog-to-digital converter 24. The analog-to-digital converter 24 is then enabled to produce a digital signal indicative of the temperature acting upon quartz capsule 12. This digital signal is then normally transmitted on data bus 26 to a microprocessor 34 which also receives the pulse train from converter 18. The microprocessor 34 may use this information along with the information from converter 18 to calculate a temperature corrected pressure.

Other uses of the microprocessor may include the calculation of the sensed pressure in different engineering units. Alternatively, the microprocessor may use the digital pressure information from several pressure sensors (not shown) in other calculations to compute other more complex data such as mach number, air speed, angle of attack, or yaw angle. In other words, several pressure sensors may have a connection to a single microprocessor, which may use data from the various sensors to calculate results dependent upon input from more than one of the sensors. Alternatively, analog-to-digital converter 24 and microprocessor 34 may simply produce a visual readout on a visual display device (not shown).

Also available to both the microprocessor 34 via data bus 26 is a calibration memory 36. The quartz capsule 12 is serially manufactured, and the individual pressure-versus-capacitance characteristics of each capsule differ sufficiently so that desired accuracy may not be achieved. As a result, each quartz capsule 12 is tested under a predetermined range of pressure and temperature conditions. Differences between actual pressure and indicated pressure for a given set of temperature and pressure conditions are permanently stored in a Programmable Read Only Memory (PROM) of the calibration memory 36. Each calibration memory 36 has data in its memory specific to only one quartz capsule 12. As a result, the quartz capsule 12 and the calibration memory 36 are a set always used together in a sensor 10. The microprocessor 34 utilizes correction values derived from calibration memory 36 in calculating a corrected pressure value, which may be output to an aircraft pilot or further used in air data computation.

Figure 2:
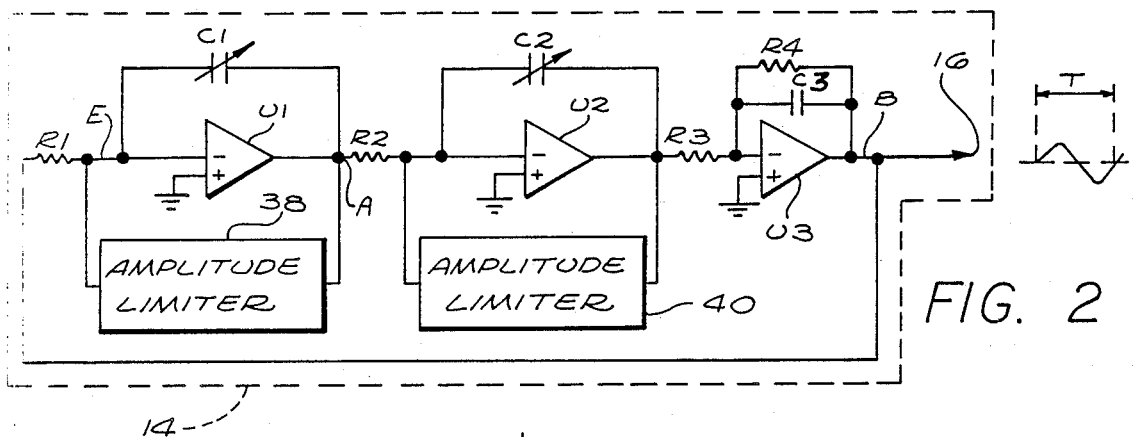
FIG. 2 is a simplified circuit diagram of the oscillator circuit block of FIG. 1.

Referring to FIG. 2, a simplified schematic of the oscillator circuit 14 of the present invention is illustrated. Oscillator circuit 14 includes three series connected operational amplifiers, namely, U1, U2, and U3. Operational amplifiers U1 and U2 are integrating operational amplifiers, while operational amplifier U3 is an inverting operational amplifier. A variable capacitor C1, connected in parallel with operational amplifier U1, and a variable capacitor C2, connected in parallel with operational amplifier U2 are also included in circuit 14. Both of these capacitors reside physically within quartz capsule 12, which is shown schematically in FIG. 1. Capacitor C1 and capacitor C2 exhibit substantially identical capacitance throughout the range of pressures to which quartz capsule 12 is subjected.

An amplitude limiter 38 is connected in parallel with operational amplifier U1 to limit the positive peak of the sinusoidal output thereof. Likewise, an amplitude limiter 40 is connected in parallel with operational amplifier U2 to similarly limit the negative peak of the sinusoidal output thereof. In general, amplitude limiters which limit both voltage peaks are placed around the gain elements of a circuit. However, the present inventive circuit employs amplitude limiters which are separated and placed on respective ones of the operational amplifiers U1 and U2 for reasons which will be more fully described hereinbelow. The amplitude limiters 38 and 40 are especially designed to operate in the low capacitance environment required for the present invention and are further described herein below.

It is noted that the noninverting inputs of the three operational amplifiers are grounded. The output of operational amplifier U1 is connected to the inverting input of operational amplifier U2 through a resistor R2. The output of operational amplifier U2 is connected to the inverting input of operational amplifier U3 through a resistor R3. The output of operational amplifier U3 is connected to the inverting input of operational amplifier U1 through a resistor R1. Both a resistor R4 and a capacitor C3 are connected in parallel with the inverting input of operational amplifier U3. Also shown in FIG. 2, and to the right of the depicted circuit, is a graphic representation of the sine wave electrical output signal of the oscillator circuit 14. The signal has a period "T", and a corresponding frequency in accordance with the following time period relationship:

$$T = 2\pi \sqrt{R1\,R2\,C1\,C2\,\frac{R3}{R4}} \qquad \text{(equation 1)}$$

If, R1=R2=R, and C1=C2=C, and R3=R4, then, T=2$\pi$RC (equation 2). We then see from the above relationship that the circuit of FIG. 2 produces an output which is linearly related to the value of equal capacitances C1 and C2. A linear output, in terms of period change as a function of pressure change, will result in a decreased requirement for computational time and memory dedicated to deciphering a value for the sensed pressure based upon the oscillation period produced by the circuit. A linear output will also facilitate a more rapid calculation of the rate of change of pressure. This time savings would be critical when the pressure data is needed for real time systems relating to aircraft well being, such as determination of pitch and yaw rates.

One simplified explanation of the operation of this circuit in terms of its transfer function, is facilitated by viewing it as a simulated inductor in parallel with a capacitor. Referring to FIG. 2, the networks' transfer function from the output of operational amplifier U1, labelled Point A for convenience, to the output of operational amplifier U3, labelled B for convenience, is:

$$\frac{(Vo)B}{(Vo)A} = \frac{1}{s(R2)(C2)} \frac{R4}{R3} \qquad \text{(equation 3)}$$

In the above equation, s is the Laplace variable and provided that R3 equals R4, feedback current through the resistor R1 from point B to the input of operation amplifier U1, labeled E for convenience is:

$$i_f = \frac{(Vo)B}{R1} = \frac{(Vo)A}{s(R1)(R2)(C2)} \qquad \text{(equation 4)}$$

Solving for the equivalent impedance of the loop from A to B with these two equations gives:

$$Z_L = \frac{(Vo)A}{i_f} = s(R1)(R2)(C2). \qquad \text{(equation 5)}$$

Since the Laplace variable is a numerator term, $Z_L$, the overall impedance is therfore shown to be inductive where the term R1, R2, C2 is equivalent to an inductance L. This equivalent inductance loop is in parallel with capacitor C1, and operational amplifier U1, to form a simulated L-C circuit not requiring an inductor. The parallel inductive capacitive combination formed can be shown to resonate at a frequency dependent upon the values of C1 and C2 in accordance with the time period relationship of equations (1) and (2) shown above.

The capacitor C3 is required to insure that the oscillator always starts when power is first applied. Capacitor C3 does this by providing a high frequency, low impedence path around resistor R4, making the simulated inductor appear very large for a short period of time. This short term increase in the apparent size of the simulated inductor causes the gain around operational amplifier U1 to be very high and the oscillation frequency low. Consequently, the oscillator circuit 14 is forced into an oscillating mode. Also, capacitor C3 is necessary because of small finite losses in the circuit. Without capacitor C3 the circuit could find a stable state in which all three operational amplifiers have zero voltage inputs with no oscillation.

The amplitude limiters required for the oscillator circuit 14 must satisfy the limiting requirements of a precision oscillator while not introducing errors detrimental to performance of the sensor. Particularly, capacitance errors must not be introduced which are parallel with capacitors C1 and C2. The magnitude of the amplitude limiters capacitance must be very low and stable. The present invention provides separated amplitude limiters in order to minimize introduction of capacitance across any one of the operation amplifiers U1 and U2.

Figure 3:
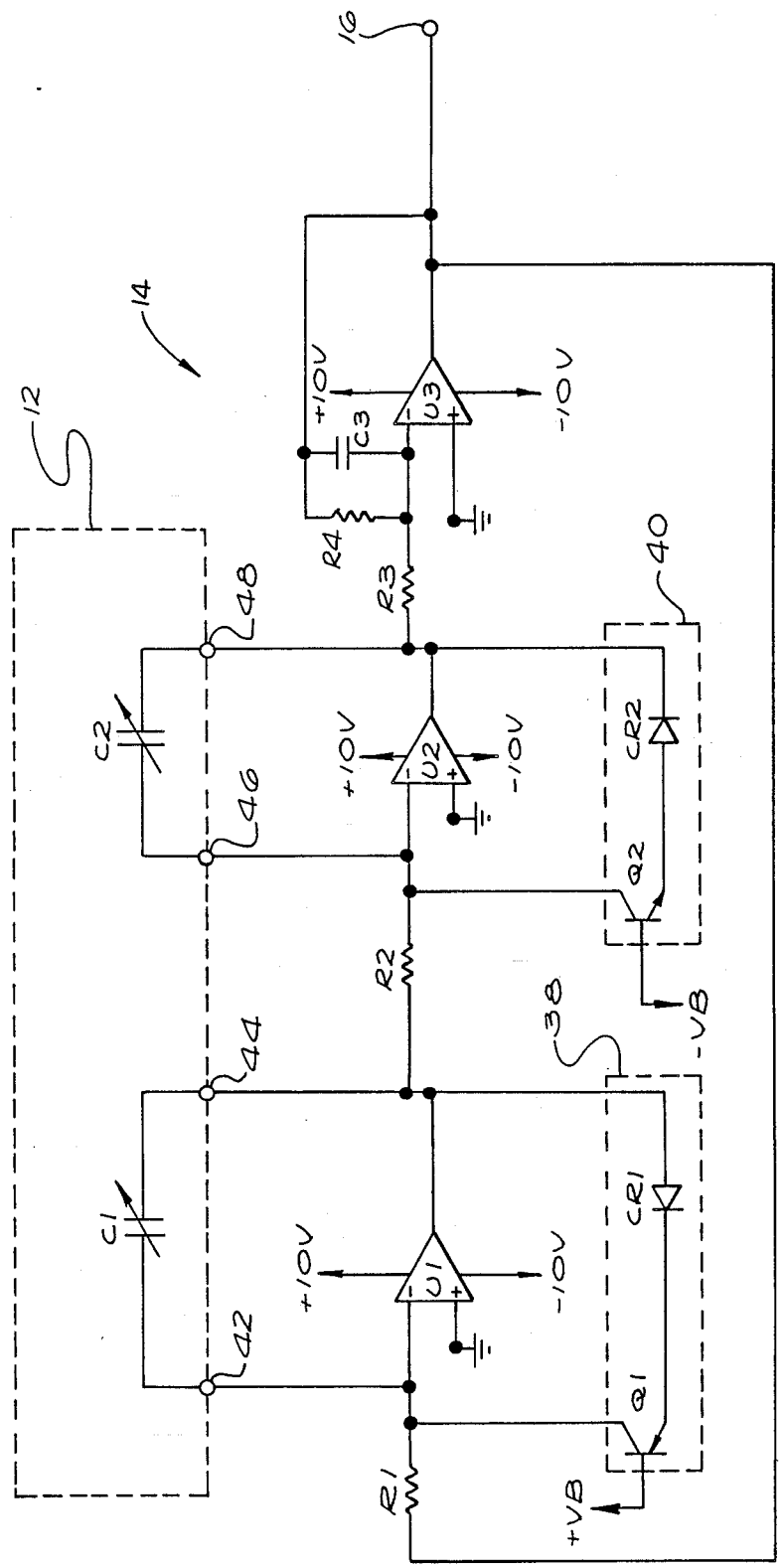
FIG. 3 is a detailed circuit schematic of both the oscillator circuit block of FIG. 1, and the simplified circuit diagram of FIG. 2.

Referring to FIG. 3, a detailed circuit of the present invention is illustrated. The dash lines surrounding capacitors C1 and C2 indicate the general boundary of the quartz capsule 10. In a typical application, capacitors C1 and C2 will operate over a range of values from about 18 picofarads to about 51 picofarads. Of course, any value for capacitors C1 and C2 can be chosen, but small capacitances allow a small physical size for the quartz capsule 10. Capacitor C1 is connected in the circuit of the present invention by connections 42, 44. Operational amplifier U1 is powered by both a positive ten volt source and a negative ten volt source.

The circuit elements which perform the function of positive amplitude limiter 38 depicted in FIG. 2 include a PNP transistor Q1 and a diode CR1. The collector of transistor Q1 is connected to the inverting input of operational amplifier U1. The emitter of transistor Q1 is connected to diode CR1. Diode CR1 is oriented to allow current flow only from diode CR1 into transistor Q1. The other side of diode CR1 is connected to the output of operational amplifier U1. The base of transistor Q1 is connected to a positive voltage source +VB. By way of example, during most of the sinusoidal waveform, except for the positive peak, diode CR1 and transistor Q1 (base to emitter) are reverse biased by virtue of voltage +VB.

However, when amplifier U1 drives sufficiently positive to forward bias both transistor Q1 and diode CR1, the output of amplifier U1 flows from output to input via the amplitude limiter. This current flow reduces the amplifier output toward zero. When the output of amplifier U1 changes slope (i.e. begins to decrease) the reverse bias returns to diode CR1 and transistor Q1. The time period during which amplitude limiter 38 functions is only a few degrees out of each sinusoidal cycle. During the rest of the cycle, the amplitude limiter 38 has little effect on the remainder of the circuit 14, and displays a capacitance below a few tenths of a pico Farad.

The output of operational amplifier U1 is electrically connected to the inverting input of operational amplifier U2 through a resistor R2, having a value selected to result in a chosen period of oscillation. For example, resistor R2 may have a value of 130,000 ohms. Variable capacitor C2 is connected in parallel with the inverting input, and output, respectively, of operational amplifier U2 through connections 46, 48.

The circuit elements which comprise amplitude limiter 40 of FIG. 2 include an NPN transistor Q2 and a diode CR2. The collector of transistor Q2 is connected to the inverting input of operational amplifier U2. The emitter of transistor Q2 is connected to diode CR2. Diode CR2 is oriented to allow current flow away from transistor Q2. The other end of diode CR2 is connected to the output of operational amplifier U2. The base of transistor Q2 is connected to a a negative voltage supply −VB. Amplitude limiter 40 functions as described above for amplitude limiter 38.

The output of operational amplifier U2 is connected to the inverting input of operational amplifier U3 through a resistor R3 which has a value of, for example, 130,000 ohms. The noninverting input of operational amplifier U3 is grounded. Operational amplifier U3 is powered by a positive 10 volt and a negative 10 volt voltage source. The output of operational amplifier U3 is connected to the inverting input thereof through a parallel combination of a resistor R4 and a capacitor C3. Resistor R4 has a resistance of, for example, 10,000 ohms. Capacitor C3 preferably has a value of 24 picofarads.

The output of operational amplifier U3 is connected to the inverting input of operational amplifier U1 through a resistor R1, which has a value of 130,000 ohms. The output of operational amplifier U3 is connected to conductor 16 which was previously shown in FIGS. 1 and 2. The signal from conductor 16 is then available for electrical connection to converter 18 for processing in the above-mentioned manner.

Figure 4:
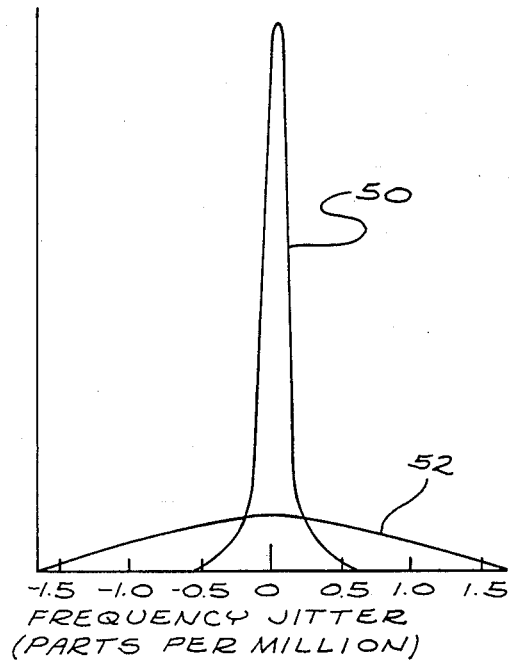
FIG. 4 is a graph showing the statistical distribution of frequency jitter exhibited by the oscillator circuit of the present invention in comparison with that of a conventional single R-C oscillator.

Referring to FIG. 4, a statistical distribution of the frequency jitter obtainable with the present invention is shown as line 50. Also shown as line 52, for comparison, is the statistical distribution of the jitter characteristic obtainable with a conventional single R-C (resistive-capacitive) oscillator which does not have the advantages of the present invention. Frequency jitter is a statistical measure of how often the frequency produced by a circuit matches with its average, true value. Put another way, it is a measure of the "scatter" of a signal frequency about its average value. On FIG. 4, this scatter is measured in parts per million. We see that for the present invention there are no statistically significant variations in frequency beyond 0.5/1,000,000 on either side of the expected frequency. For the conventional single R-C oscillator, however, we expect to find statistically significant variation in frequency as far as 1.5/1,000,000 on either side of the expected frequency. This means that the simulated L-C oscillator using the circuit of the present invention, is about 3 times as accurate as the conventional single R-C oscillator. In aerospace applications where accuracy and resolution are extremely important. A threefold increase in the precision of the frequency jitter is quite significant.

It is to be understood that the circuit of the present invention can be utilized with a single capacitive sensor. For example, capacitor C1 could be contained in a sensor which varies as a function of pressure. Capacitor C2 could then be a fixed capacitor. The sine wave output of oscillator 14 would then be dependent upon the change in capacitance of capacitor C1 alone. However, the time period and frequency provided as a result of the change in the capacitance of capacitor C1 would not be linearly dependent on that change. As previously indicated, such an arrangement would require increased memory and computational time to correlate a given frequency with its related pressure. If the circuit of the present invention were utilized with one variable capacitor, C1 and one fixed capacitor, C2, the jitter characteristic would be equivalent to that shown in FIG. 4 because the circuit would still be a tuned simulated inductor L-C circuit.

While a specific embodiment of this invention has been disclosed in the foregoing description, no limitation upon the invention is implied by each reference to a single preferred embodiment thereof, and none is to be inferred. The invention is intended to be limited only by the spirit and scope of the appended claims, which provide additional definition of the invention.

We claim:

1. A sensor responsive to a variable physical parameter and producing an electrical signal varying in response to changes in said physical parameter, said sensor comprising: a variable first capacitor responsive to said physical parameter to change capacitance value predictably in response to change of said physical parameter, a second capacitor, circuit means including said first capacitor and said second capacitor for defining a simulated tuned inductor-capacitor circuit having an inductive impedance and not requiring an inductor, said circuit means including a pair of series connecting integrating operational amplifiers, one of said pair of operational amplifiers being in parallel connection with said first capacitor and the other of said pair of operational amplifiers being in parallel connection with said second capacitor, and an inverting operational amplifier series connecting with said pair of operational amplifiers between an output of a first and an input of a second thereof.

2. The invention of claim 1 wherein said series connection of said inverting operational amplifier includes a resistance of value $R_1$ intermediate an output of said inverting operational amplifier and input of said second of said pair of operational amplifiers, said series connection of said pair of operational amplifiers including a resistance of value $R_2$ between said pair of operational amplifiers.

3. The invention of claim 2 wherein said circuit means has a period of oscillations T which may be characterized by the relation $$T = 2\pi \sqrt{R_1 R_2 C_1 C_2}$$

wherein $C_1$ and $C_2$ are values of said first and second capacitors, respectively.

4. The invention of claim 3 wherein said second capacitor also is variable and responsive to said physical parameter to change capacitance value in response to change of said physical parameter, said first capacitor and said second capacitor being always substantially the same value and equal to a capacitance value C, whereby the period T of said circuit means may be characterized by the relation:

$$T = 2\pi C \sqrt{R_1 R_2}.$$

5. The invention of claim 4 wherein said series connection of said inverting operational amplifier includes a resistance of value $R_3$ intermediate an output of said first of said pair of operational amplifiers and said inverting operational amplifier, and a resistance of value $R_4$ in parallel connection with said inverting operational amplifier, wherein said circuit means has a period of oscillation T which may be characterized by the relation:

$$T = 2\pi \sqrt{R_1 R_2 C_1 C_2 \frac{R_3}{R_4}}.$$

6. The invention of claim 1 wherein said circuit means provides a sinusoidal voltage oscillation waveform of period T and having both a positive voltage portion and a negative voltage portion, and further including voltage amplitude limiting means for limiting the maximum voltage level of each of said positive voltage portion an said negative voltage portion.

7. The invention of claim 6 wherein said voltage amplitude limiting means includes a pair of amplitude limiting circuit means, a respective one of said pair of amplitude limiting circuit means connecting in parallel with each one of said pair of series connecting integrating operational amplifiers.

8. The invention of claim 7 wherein each one of said pair of amplitude limiting circuit means includes a transistor and a diode in series connection.

9. The invention of claim 8 wherein said diode is in series connection between an emitter of said transistor and an output of the respective one of said pair of operational amplifiers, a collector of said transistor connecting to an input of said one operational amplifier, and the base of said transistor connecting to a source of selected voltage.

10. The invention of claim 1 wherein said circuit means provides a sinusoidal voltage oscillation waveform (SVOW) of period T, said sensor further including a reference frequency oscillator providing a reference frequency signal (RFS), and an oscillator period-to-digital converter (P to D) receiving both said (SVOW) and said (RFS) and providing a pulse train (PT) having a count indicative of the period T of said (SVOW).

11. The invention of claim 10 wherein said sensor further includes a microprocessor, and data bus means receiving said (PT) from said converter and communicating said (PT) to said microprocessor.

12. The invention of claim 11 wherein said sensor further includes a temperature sensor in substantial temperature equality association with said first and said second capacitors, and means communicating with both said temperature sensor and said data bus means for providing thereto a signal (TS) indicative of the temperature of said temperature sensor.

13. The invention of claim 12 further including a calibration memory storing temperature dependent calibration factors, said calibration memory communicating with said microprocessor via said data bus and providing said calibration factors to said microprocessor.

14. The invention of claim 11 wherein said sensor further includes a reference frequency oscillator oscillating at a respective reference period to provide a signal (RFS), an oscillation period-to-digital converter receiving both said (SVOW) signal and said (RFS) signal and producing respective digital format conversions thereof, and processing means receiving said digital format conversions and providing a signal analogous to said physical parameter in response thereto.

15. The invention of claim 14 further including temperature responsive means in temperature equivalence relation with said variable capacitor, and temperature signal generating means for producing a signal indicative of temperature of said temperature responsive means.

16. The invention of claim 15 wherein said temperature signal generating means includes an amplifier associating with said temperature responsive means and producing an analog signal indicative of temperature thereof, and an analog-to-digital converter receiving said analog temperature signal and providing a digital temperature signal in response thereto.

17. The invention of claim 16 further including data bus means communicating said processor means with said temperature signal generating means for providing said digital temperature signal to said processor means.

18. The invention of claim 14 further including memory means storing calibration data pertaining to said sensor and correlating changes in both capacitance value and temperature thereof with various levels of said phyiscal parameter acting thereon, said memory means responding to said processor means to provide said calibration data thereto.

19. The invention of claim 18 also including data bus means communicating said memory means with said processor means for providing said calibration data to the latter.

20. The invention of claim 14 further including data bus means communicating said processor means with said converter for providing said digital format conversions to said processor means.

21. The invention of claim 10 wherein said oscillation period-to-digital converter includes a high-speed comparator providing a square waveform in synchronization with said (SVOW), and a divider performing a divide-by-N function on said square waveform to periodically achieve a unity result from said division, and a gate opening and closing in response to said achievement of a unity result to allow passage of a selected number of pulses originating with said (RFS) to produce said (PT).

22. A sensor producing an electrical signal analogous to a variable physical parameter, said sensor including:
a variable capacitor responsive to said physical parameter and changing value predictably in accord with variation of said physical parameter; and
an oscillator circuit means including said variable capacitor for simulating a resonant capacitor-inductor tuned circuit and including an inductive impedance characteristic without requiring an inductor, said oscillator circuit means oscillating at a variable period which is a function of said value of said variable capacitor to produce a sinusoidal voltage oscillation waveform signal (SVOW).

23. The invention of claim 22 wherein said oscillator circuit means includes a pair of series connected integrating operational amplifiers, said pair of operational amplifiers series connecting with an inverting operational amplifier, said variable capacitor being disposed in parallel connection with one of said pair of operational amplifiers, another capacitor parallel connecting with the other of said pair of operational amplifiers, and amplitude limiting means, said amplitude limiting means parallel connecting with one of said pair of operational amplifiers.

24. The invention of claim 23 further including resistances $R_l$, $R_2$, and $R_3$ respectively disposed between an output of said inverting operational amplifier and an input of one of said pair of operational amplifiers, between said pair of operational amplifiers, and between an output of the other of said operational amplifiers and an input of said inverting operational amplifier, and a fourth resistance $R_4$ disposed in parallel with said inverting operational amplifier between an output and an input thereof.

25. The invention of claim 24 wherein said variable capacitor has a variable value $C_l$, said another capacitor has a value $C_2$, and wherein said oscillator circuit has a period of oscillation T characterized by the relation:

$$T = 2\pi \sqrt{C_1 C_2 R_1 R_2 \frac{R_3}{R_4}}.$$

26. The invention of claim 25 wherein said another capacitor is variable, the value $C_l$ is substantially equal to the value $C_2$ and both are represented by the value C, wherein the value $R_3$ is substantially equal to $R_4$ and the quotient of the term $R_3$ divided by $R_4$ is substantially equal to one (1), and wherein the period T is characterized by the relation:

$$T = 2\pi C \sqrt{R_1 R_2}.$$

27. The invention of claim 23 wherein each of said amplitude limiting means includes a pair of amplitude limiting circuits each including a transistor and a diode in series connection, said diode connecting with an emitter of said transistor and with said output of a respective one of said pair of operational amplifiers, a collector of said transistor connecting with said input of said respective one operational amplifier, and a base of said transistor connecting with a source of selected voltage.

28. The method of providing a digital signal indicative of a fluid pressure, said method comprising the steps of:
providing a variable capacitor;
varying the capacitance value of said variable capacitor in accord with the level of said fluid pressure;
providing a resonant oscillator circuit including said variable capacitor and simulating a tuned inductor-capacitor circuit having an inductive impedance and not requiring an inductor; and
oscillating said oscillator circuit at a tuned variable frequency to produce a first signal of variable oscillation period indicative of said fluid pressure level; and
producing said digital signal in response to said variable first signal.

29. The method of claim 28 further including the steps of:
providing a reference oscillator having a constant reference frequency of oscillation;
producing a reference pulse train in response to oscillation of said reference frequency oscillator;
performing a divide-by-N operation upon said first signal, wherein N is a selected integer, to achieve a selected quotient;
employing a gate to enable passage of at least one pulse from said reference pulse train upon achievement of said selected quotient; and
utilizing a timed accumulation of passage-enabled pulses from said reference pulse train as a basis for said digital signal.

30. The method of claim 29 further including the steps of:
providing a tabulation of calibration data correlating actual fluid pressure applied to said variable capacitor with indicated pressure as appearing from said timed accumulation of passage-enabled pulses;
correcting said digital signal according to the difference (if any) between indicated pressure appearing from said timed accumulation of passage-enabled pulses and a correlated actual pressure value from said tabulation.

31. The method of claim 30 further including the steps of:
providing a temperature responsive element in substantial temperature equivalence with said variable capacitor;
producing a temperature signal in accord with the temperature of said temperature responsive element;
producing a temperature correction signal in response to said temperature signal; and
correcting said digital signal according to said temperature correction signal.

32. The method of claim 31 wherein said step of producing said digital signal in response to said variable frequency includes the steps of:
providing a processor;
providing said accumulation of passage-enabled pulses to said processor;
providing said tabulation of calibration data to said processor;
providing said temperature correction signal to said processor; and
producing said digital signal with said processor as a function of said accumulation of passage-enabled pulses, said temperature correction signal, and at least one calibration data correlation from said tabulation.

* * * * *